US 8,050,665 B1

(12) United States Patent
Orbach

(10) Patent No.: US 8,050,665 B1
(45) Date of Patent: Nov. 1, 2011

(54) ALERT REMINDER TRIGGER BY MOTION-DETECTOR

(75) Inventor: Julian Orbach, New South Wales (AU)

(73) Assignee: Avaya Inc., Basking Ridge, NJ (US)

( * ) Notice: Subject to any disclaimer, the term of this patent is extended or adjusted under 35 U.S.C. 154(b) by 334 days.

(21) Appl. No.: 11/551,346

(22) Filed: Oct. 20, 2006

(51) Int. Cl.
*H04M 3/00* (2006.01)

(52) U.S. Cl. ............... 455/418; 455/575.1; 340/541; 340/539.1

(58) Field of Classification Search .......... 455/567, 455/461, 557, 558, 575.1, 418; 340/539, 340/309, 541, 539.1; 379/49; 370/342, 310, 370/428, 338; 368/10
See application file for complete search history.

(56) References Cited

U.S. PATENT DOCUMENTS

| | | | |
|---|---|---|---|
| 4,993,068 A | 2/1991 | Piosenka et al. | |
| 5,428,663 A | 6/1995 | Grimes et al. | |
| 5,956,626 A | 9/1999 | Kaschke et al. | |
| 6,067,621 A | 5/2000 | Yu et al. | |
| 6,400,996 B1 * | 6/2002 | Hoffberg et al. | 700/83 |
| 6,438,393 B1 * | 8/2002 | Suuronen | 455/575.1 |
| 6,650,894 B1 | 11/2003 | Berstis et al. | |
| 6,883,095 B2 | 4/2005 | Sandhu et al. | |
| H2120 H | 7/2005 | Cudlitz | |
| 6,915,123 B1 | 7/2005 | Daudelin et al. | |
| 6,928,166 B2 | 8/2005 | Yoshizawa | |
| 6,928,558 B1 | 8/2005 | Allahwerdi et al. | |
| 6,934,848 B1 | 8/2005 | King et al. | |
| 6,968,179 B1 | 11/2005 | De Vries | |
| 6,976,164 B1 | 12/2005 | King et al. | |
| 6,987,948 B2 | 1/2006 | Engstrom et al. | |
| 6,999,562 B2 * | 2/2006 | Winick | 379/42 |
| 7,016,666 B2 | 3/2006 | Lauper et al. | |
| 7,212,827 B1 | 5/2007 | Veschl | |
| 7,346,336 B2 * | 3/2008 | Kampel et al. | 455/404.2 |
| 7,369,845 B2 * | 5/2008 | Keohane et al. | 455/418 |
| 7,613,659 B1 | 11/2009 | Hoffman et al. | |
| 7,689,199 B2 * | 3/2010 | Gough | 455/404.1 |
| 2001/0049275 A1 * | 12/2001 | Pierry et al. | 455/414 |
| 2002/0010008 A1 * | 1/2002 | Bork et al. | 455/567 |
| 2002/0012186 A1 | 1/2002 | Nakamura et al. | |
| 2002/0038422 A1 | 3/2002 | Suwamoto et al. | |
| 2002/0137552 A1 * | 9/2002 | Cannon et al. | 455/567 |
| 2002/0154036 A1 * | 10/2002 | Flick | 340/988 |
| 2002/0194473 A1 | 12/2002 | Pope et al. | |
| 2003/0003965 A1 * | 1/2003 | Gough | 455/567 |
| 2003/0144959 A1 | 7/2003 | Makita | |
| 2004/0030753 A1 * | 2/2004 | Horvitz | 709/206 |
| 2004/0076324 A1 * | 4/2004 | Burl et al. | 382/153 |
| 2004/0103324 A1 | 5/2004 | Band | |
| 2004/0127198 A1 * | 7/2004 | Roskind et al. | 455/412.2 |

(Continued)

OTHER PUBLICATIONS

ADTech Engineering, IP Phone SI-160 User Manual (SCCP releases) Version 1.2 (2002), pp. 1-20.

(Continued)

*Primary Examiner* — Meless N Zewdu
*Assistant Examiner* — Mahendra Patel
(74) *Attorney, Agent, or Firm* — Sheridan Ross P.C.

(57) ABSTRACT

Disclosed herein is a system and method for selectively providing an audible alert to remind the user of a mobile communication device that they have received an incoming message. A first alert is provided initially after the incoming messages is received. Thereafter, additional alerts are suppressed unless motion of the mobile communication device is detected.

10 Claims, 3 Drawing Sheets

U.S. PATENT DOCUMENTS

| | | | |
|---|---|---|---|
| 2004/0162998 A1 | 8/2004 | Tuomi et al. | |
| 2004/0180646 A1 | 9/2004 | Donley | |
| 2004/0209594 A1* | 10/2004 | Naboulsi | 455/404.1 |
| 2004/0252197 A1* | 12/2004 | Fraley et al. | 348/207.1 |
| 2005/0064914 A1* | 3/2005 | Gough | 455/567 |
| 2005/0101314 A1* | 5/2005 | Levi | 455/423 |
| 2005/0191969 A1* | 9/2005 | Mousseau | 455/90.2 |
| 2005/0259641 A1* | 11/2005 | Beninato et al. | 370/354 |
| 2005/0266891 A1* | 12/2005 | Mullen | 455/567 |
| 2006/0105817 A1* | 5/2006 | Naick et al. | 455/567 |
| 2006/0116175 A1* | 6/2006 | Chu | 455/567 |
| 2006/0167944 A1 | 7/2006 | Baker | |
| 2006/0181411 A1* | 8/2006 | Fast et al. | 340/539.13 |
| 2006/0270421 A1* | 11/2006 | Phillips et al. | 455/457 |
| 2006/0293037 A1* | 12/2006 | Signore | 455/417 |
| 2007/0032832 A1* | 2/2007 | Feher | 607/32 |
| 2007/0173233 A1* | 7/2007 | Vander Veen et al. | 455/413 |
| 2007/0247366 A1* | 10/2007 | Smith et al. | 342/464 |
| 2008/0032703 A1 | 2/2008 | Krumm et al. | |

OTHER PUBLICATIONS

"The Cricket Indoor Location System: An NMS Project @ MIT LCS" at http://nms.lcs.mit.edu/projects/cricket (Jul. 31, 2002), pp. 1-5.

Roger Clarke, "Centrelink Smart Card Technical Issues Starter Kit Chapter 7" (Apr. 8, 1998) at http://www.anu.edu.au/people/Roger.Clarke/DV/SCTISK.html, pp. 1-3.

Datakey, "Securing a Virtual Private Network with Smart Card Technology" available at www.datakey.com, pp. 1-8, Aug. 1, 2002.

"Smart Card Authentication" at http://msdn.microsoft.com/library/en-us/security/security/smart_card_authentication.asp (Aug. 2002), pp. 1-2.

"Smart Card Interfaces" at http://msdn.microsoft.com/library/en-us/security/security/smart_card_interfaces.asp (Aug. 2002), p. 1.

"Primary Service Provider" at http://msdn.microsoft.com/library/en-us/security/security/primary_service_provider.asp (Aug. 2002), p. 1.

"Introducing Smart Cards to the System" at http://msdn.microsoft.com/library/en-us/security/security/introducing_smart_cards_to_the_system.asp (Aug. 2002), p. 1.

"Accessing a Smart Card" at http://msdn.microsoft.com/library/en-us/security/security/accessing_a_smart_card.asp (Aug. 2002), p. 1.

"Smart Card Resource Manager" at http://msdn.microsoft.com/library/en-us/security/security/smart_card_resource_manager.asp (Aug. 2002), p. 1.

"Smart Card User Interface" at http://msdn.microsoft.com/library/en-us/security/security/smart_card_user_interface.asp (Aug. 2002), p. 1.

"Smart Card Service Providers" at http://msdn.microsoft.com/library/en-us/security/security/smart_card_service_providers.asp (Aug. 2002), p. 1.

"Base Service Providers" at http://msdn.microsoft.com/library/en-us/security/security/base_service_providers.asp (Aug. 2002), p. 1.

"Building and ISO7816-4 APDU Command" at http://msdn.microsoft.com/library/en-us/security/security/building_an_iso7816_4_apdu_command.asp (Aug. 2002) pp. 1-2.

"Vendor Wrapper Service Provider" at http://msdn.microsoft.com/library/en-us/security/security/vendor_wrapper_service_provider.asp (Aug. 2002), pp. 1-2.

Official Action for U.S. Appl. No. 11/773,276, mailed Apr. 1, 2010.
Official Action for U.S. Appl. No. 11/773,276, mailed Aug. 17, 2010.
Official Action for U.S. Appl. No. 11/773,276, mailed Mar. 4, 2011 22 pages.

* cited by examiner

ALERT REMINDER TRIGGER BY MOTION-DETECTOR

FIELD OF THE INVENTION

Audible alert reminders for mobile communication devices.

BACKGROUND OF THE INVENTION

Mobile communication devices, such as mobile phones or personal digital assistants (PDA), may use an audible alert to remind a user that the device has received an incoming message. For example, a cell phone may beep when a voice message is received, or a PDA may play a certain tone when a text message is received. Typically, these audible alerts continue to sound at a certain interval until the user listens to the voice mail or reads the text message. Alternatively, the device may sound an audible alert only once after the message is received.

If the user does not listen to the message immediately, continued audible alerts can become bothersome to the user or to people nearby. For instance, a user may leave a cell phone at a desk while at lunch. If, during this time, a voice message is received, co-workers in the vicinity of the user's desk may become annoyed by the continual alert reminders.

A solution to this problem is to simply disable the alert reminder when the phone is left unattended. While this may serve to prevent others from being bothered, this solution suffers from a number of disadvantages. In particular, the alert needs to be repeatedly enabled and disabled at various times throughout the day. Additionally, a user may forget to enable the alert reminder and as a result he or she may miss messages that have been received but not reviewed.

Accordingly, it would be desirable to have a system that sounds an alert reminder associated with a communication device at times when the user of the device can be assumed to be in the presence of the device and as a result able to review his or her messages. Furthermore, it would be desirable to have an alert reminder system that minimizes the bothersome effect that its audible alerts may have on people other than the user of the device.

SUMMARY OF THE INVENTION

The present invention is directed to an audible alert for a mobile communication device that is triggered by a motion detector associated with the mobile communication device. The audible alert is used to remind the user of the mobile communication device that he or she has a message that has not been accessed. For example, a person may not answer his or her mobile phone and the calling party is then directed to a voice mail system. If the calling party leaves a voice message, an audible alert may sound once to provide an initial reminder that the message is awaiting review. After the first reminder, additional reminders are only given in response to a detected motion of the mobile communication device. After the message is heard, no further audible alerts are given. Additionally, the present invention may be used in connection with audible alerts used to remind a user of other types of messages, such as unread text messages. The present invention may also be used in connection with alerts issued to a user related to the operation of the device, such as low-battery warnings.

Sounding additional alerts only when the device is in motion ensures that the alert is given when the user is assumed to be in possession of the device. As a result, when the user is not in possession of the device, continual alert reminders do not bother other people.

The present invention may employ any one of a number of possible motion detection methods. For example, motion of the mobile communication device may be detected by changes in scenery as viewed from a camera associated with the device, changes in the velocity of the device as measured by inertial detectors, and/or changes in the strength of mobile communication signals. Alternatively, global positioning system technology may be used to detect motion of the mobile communication device. These methods may be used alone or in combination to detect motion of the mobile communication device.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The present invention is directed to an alert reminder for a mobile communication device that is responsive to motion of the mobile communication device. An alert reminder system in accordance with embodiments of the present invention operates to prevent continued alerts from being sounded unless motion of the mobile device is detected. If motion is detected, it is assumed that the device is in the possession of its user. As a result, additional alerts may be given to indicate the presence of an unreviewed message.

Figure 1:
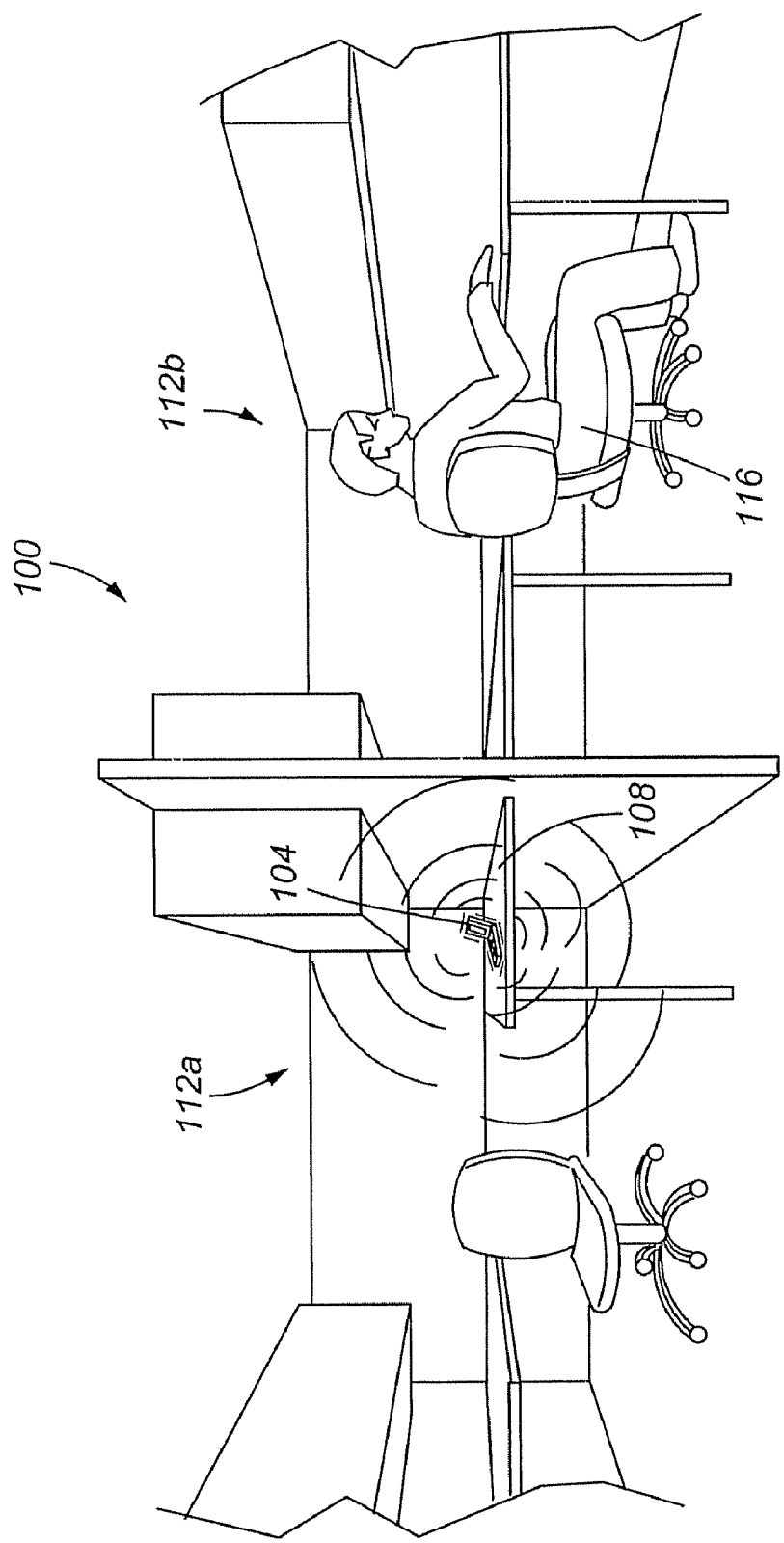
FIG. 1 is a schematic depiction of an environment in which a communication device associated with an alert reminder system in accordance with embodiments of the present invention operates.

Turning now to FIG. 1, an exemplary environment in which components and features of an alert reminder system 100 may have application are illustrated. In particular, FIG. 1 shows a mobile communication device 104 that has been left unattended at a desk 108 in a workplace environment. The mobile communication device 104 may, for example, be a cellular phone, personal digital assistant (PDA), wristwatch, an environmental detector or other device capable of mobile communication. The desk 108 is located in a cubicle 112a. An adjacent cubicle 112b in the workplace environment is also shown. The user of the mobile communication device 104 is not shown, as he is away from his desk 108. A co-worker 116 is, however, at his desk in the adjacent cubicle 112b.

FIG. 1 illustrates a situation in which a call is placed to the mobile communication device 104 at a time when the user has left the device 104 unattended. If the calling party chooses to leave a voice message, then the mobile communication device 104 may provide a first audible alert to remind the user that a message has been received and is waiting to be reviewed. The message may be in any form supported by the mobile communication device 104, such as voice mail or a text message. As can be appreciated by one of skill in the art, a mobile communication device 104 may also provide an alert after detecting a missed call or another condition requiring the user's attention, such as a low battery. Prior art alert reminders typically sound continually at regular intervals until either the alert is disabled, the message is heard, or the condition is addressed or acknowledged. If, as illustrated in FIG. 1, the mobile device 104 is left unattended, people nearby, such as the co-worker 116, may become irritated by the continual alerts.

The present invention prevents alert reminders such as these from becoming a source of irritation to co-workers or others who may be in the presence of an unattended mobile device. In particular, a first alert reminder is sounded after the message is initially received by the mobile communication device 104. This first reminder serves to alert the user once if he or she is in the vicinity of the device 104. Thereafter, additional alerts will only sound in response to motion of the mobile communication device 104 as detected by a motion detector associated with the device 104. Furthermore, a first alert may be given for each message that is received. Later, when motion of the mobile communication device 104 is detected, additional alerts may be sounded for all outstanding messages. This may include sounding separate alerts corresponding to separate message types.

In addition to providing alert reminders related to incoming messages, embodiments of the present invention may provide alert reminders for messages related to the operation of the mobile communication device 104. For example, it is common for a mobile communication device 104 to provide an audible alert indicating that an on-board battery is low. Typically, the alert is given at regular intervals until the user attends to the message by plugging the communication device into a charging device. A low battery warning delivered in accordance with embodiments of the present invention would operate differently. In particular, a first alert would be given initially. Thereafter, additional alerts would be given in response to motion of the device 104.

Figure 2:
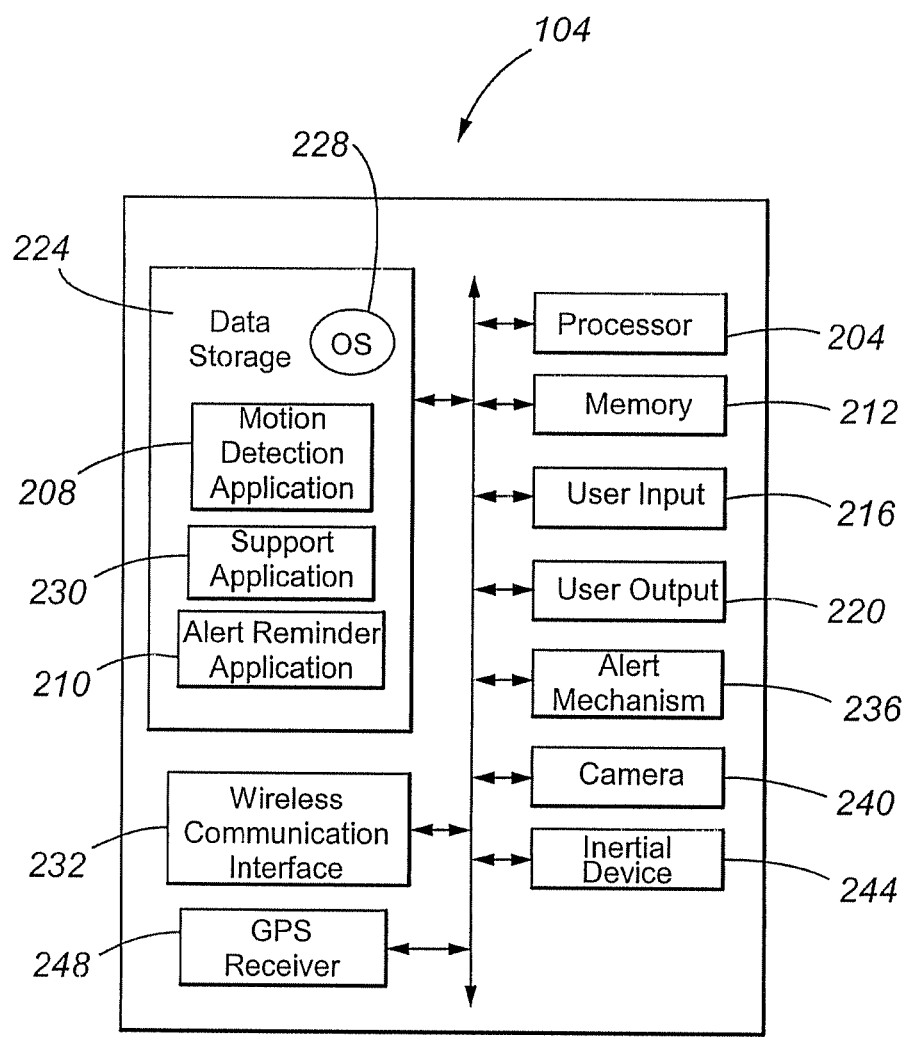
FIG. 2 is a schematic depiction of components of a mobile communication device in accordance with embodiments of the present invention.

With reference to FIG. 2, components of a mobile communication device 104 implementing some or all of the functions associated with the alert reminders system 100 are depicted in block diagram form. The components may include a processor 204 capable of executing program instructions. Accordingly, the processor 204 may include any general-purpose programmable processor, digital signal processor (DSP) or controller for executing application programming. Alternatively, the processor 204 may comprise a specially configured application specific integrated circuit (ASIC). A processor 204 generally functions to run programming code implementing various applications including a motion detection application 208 and an alert reminder application 210 as described herein.

A mobile communication device 104 may additionally include memory 212 for use in connection with the execution of the programming by the processor 204 and for the temporary or long-term storage of data or program instructions. The memory 212 may comprise solid state memory resident, removable or remote in nature, such as DRAM and SDRAM. Where the processor 204 comprises a controller, the memory 212 may be integral to the processor 204.

In addition, the mobile communication device 104 may include one or more user inputs or means for receiving user input 216 and one or more user outputs or means for outputting 220. Examples of user inputs 216 include keyboards, keypads, touch screens, touch pads and microphones. Examples of user outputs 220 include speakers, display screens (including touch screens displays) and indicator lights. Furthermore, it can be appreciated by one of skill in the art that the user input 216 may be combined or operated in conjunction with the user output 220. An example of such integrated user input 216 and user output 220 is a touch screen display that can both represent visual information to a user and receive input selections from the user.

A mobile communication device 104 may also include data storage 224 for the storage of application programming and/or data. The data storage may contain the motion detection application 208 and the alert reminder application 210 instructions. The data storage 224 may also store one or more support applications 230. Operating system software 228 may also be stored by the data storage 224. The data storage 224 may comprise, for example, a solid state memory, a magnetic storage device, a solid state storage device, an optical storage device, a logical circuit, or any combination of any such devices. It should be appreciated that the programs and data that may be maintained in the data storage 224 can comprise software, firmware or hardware logic, depending on the particular implementation of the data storage 224.

In accordance with embodiments of the present invention, a motion detection application 208 running on-board the mobile communication device 104 is provided. The motion detection application 208 determines if the device 104 is in motion and may receive input from other devices on board the mobile communication device 104 in order to detect motion. For example, many mobile communication devices, such as cellular phones, include a digital camera or photo detector. In addition to its usual function of taking pictures and/or movies, a digital camera 240 may provide input to be used to detect motion of the mobile communication device 104. In particular, when the scenery, as viewed from the camera 240 changes, it can be assumed that the device 104 is moving. Alternatively or in addition, an inertial device 240 may also be provided to detect motion of the device 104. Examples of inertial devices 244 that be used include accelerometers and mercury switches.

The mobile communication device 104 additionally includes a mobile communication interface 232 for connection to an external mobile communication network or endpoint. In addition to providing a pathway for normal mobile communication, the mobile communication interface 232 may be used in connection with the operation of the motion detection application 208. In particular, embodiments of the present invention may include portions of the motion detection application 208 that run on one or more systems that are remote from the mobile communication device 104, such as switches and/or servers. For example, changes in the strength of a mobile communication signal may indicate that the distance between mobile communication device 104 and a base station is increasing. Thus, it may be concluded that the device is in motion 104. Alternatively, switching between mobile communication cells may indicate that the device 104 is in motion. These changes may be measured locally, at the mobile communication device 104, or remotely at a server of base station. If motion is detected remotely, information related to the motion detection may be transmitted to the device 104 over the mobile communication interface 232.

In accordance with still other embodiment of the present invention, a global positioning system (GPS) receiver 248, may be provided as part of the mobile communication device 104 for providing location information that can be used to detect motion of the mobile communication device 104. Accordingly, motion of the mobile communication device 104 is determined by using known methods to measure changes in the location of the device 104.

The motion detection application 208 may use any one of the methods set forth above, or other motion detection methods, to detect motion of the mobile communication device 104. Alternatively, a combination of different motion detection methods may be used to detect motion of the mobile communication device 104. For example, the motion detection application may 208 may use both input from a camera 240 and input from a GPS receiver 248 to detect motion of the device 104.

In accordance with embodiments of the present invention, an alert reminder application 210 running on board the mobile communication device 104 is provided. The alert reminder application 210 is responsive to input from the motion detection application 208 and operates to alert the user of the presence of a message awaiting review, as described herein. The alert reminder application 210 is associated with an alert mechanism 236. The alert mechanism 236 may be a beeper, tone generator or other device that provides an audible alert perceptible to the human ear. Accordingly, an alert may be produced by a specifically provided alert mechanism 236. Alternatively or in addition, an alert may be provided by a user output device 220.

Figure 3:
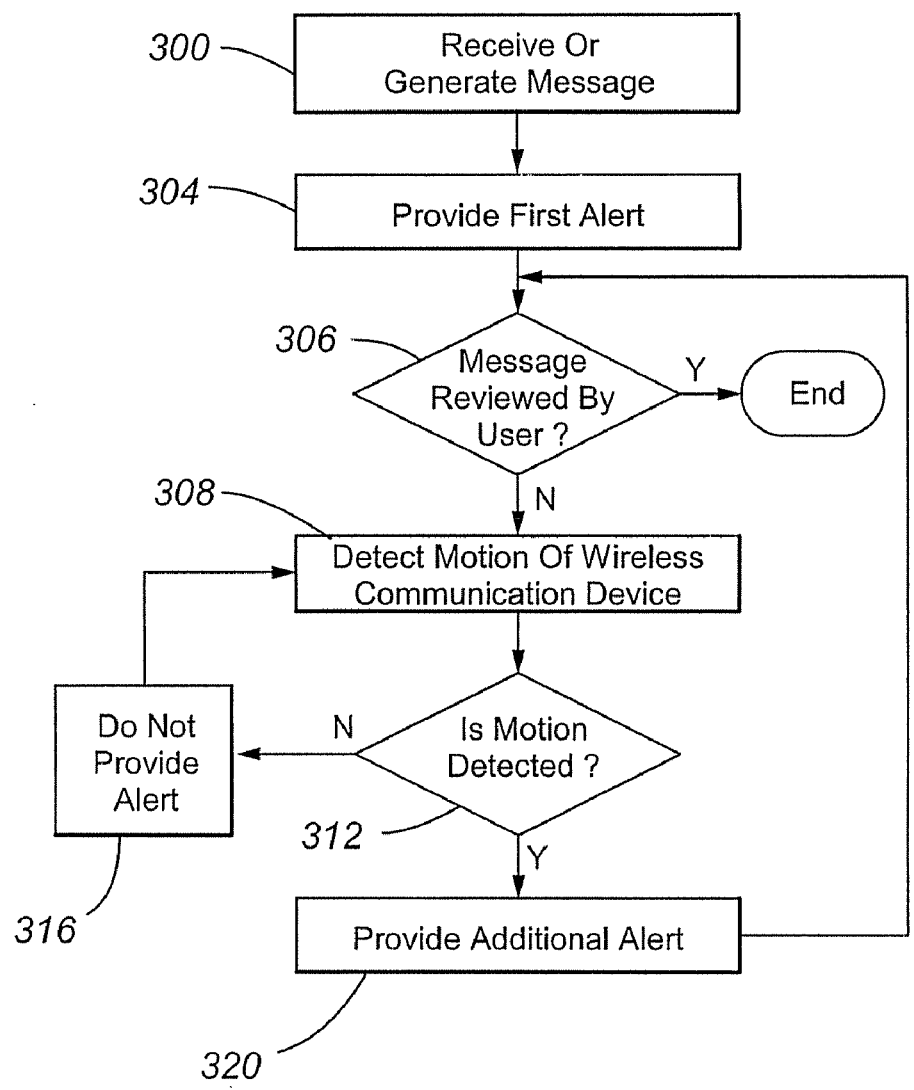
FIG. 3 is a flow chart depicting aspects of the operation of an alert reminder system in accordance with embodiments of the present invention.

With reference to FIG. 3, aspects of the operation of an alert reminder system 100 in accordance with embodiments of the present invention are illustrated. At step 300, the mobile communication device 104 receives or generates a message the presence of which a user needs to be informed. The message may be in the form of an incoming message sent to the mobile communication device 104. For example, the incoming message may be a voice message left in a voice mail box after a call to a mobile phone went unanswered. Alternatively, the incoming message may be a text message sent to a mobile phone or a personal digital assistant. The alert reminder application may also operate to inform the user of the presence of messages related to the operation of the device, such as low battery warnings.

At step 304, a first audible alert is sounded to indicate that a message is waiting to be reviewed. This first audible alert is sounded for a limited amount of time and serves to provide the user with an initial alert. This alert may or may not be heard depending on whether or not the user is in the vicinity of the mobile communication device 104. If the audible alert is heard, the user may decide to review the message and take appropriate action (decision 306). In the case of an incoming voice message, the user may listen to the voice message. In the case of a low battery warning, the user may plug the communication device into a charging device. If the message is reviewed by the user then operation of the alert reminder system may be allowed to end, and the alert for that message is cleared. If, however, the message is not reviewed by the user, the process proceeds to step 308.

At step 308, the message remains unreviewed and the motion detection application 208 proceeds to detect any motion of the mobile communication device 104. As described above, various methods of motion detection are within the scope of the invention including measuring signal strength changes, measuring changes in the terrestrial position of the device, measuring changes in the audible of the device, or detecting changes in scenery as viewed from a camera 240 associated with the device 104.

At decision diamond 312, the motion detection application 208 determines if motion of the mobile communication device 104 has been detected. If no motion is detected, then no alert reminders are provided (step 316). After step 316, step 308 follows, and the motion detection application 208 continues to detect motion of the mobile communication device 104. If, at decision 312, motion of the mobile communication device 104 is detected, then an additional audible alert is provided (step 320). After step 320, the process returns to step 306 in order that the motion detection application 208 may continue to suppress further alerts in the absence of detection of motion of the mobile communication device 104. The operation of the alert reminder system continues in this way until the user of the mobile communication device attends to the unreviewed message or messages.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation. The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of operating a mobile communication device comprising:
   detecting a condition by the mobile communication device, wherein the mobile communication device includes a motion detector, and wherein the condition is at least one of: a missed call, a voice message received by the mobile communication device, a text message received by the mobile communication device, a low battery state, a change in service, an appointment, and an alarm;
   generating, by the mobile communication device, a first alert signal in response to detecting the condition;
   determining, by the mobile communication device and after the first alert signal, that the mobile communication device has not been moved;
   in response to determining that the mobile communication device has not been moved, automatically suppressing, by an application running on the mobile communication device, at least a second alert signal associated with the condition;

determining, after the suppression step and by the motion detector, that the mobile communication device has been moved; and in response to the determining that the mobile communication device has been moved, generating, by the mobile communication device, at least one additional alert signal associated with the condition.

2. The method of claim 1 wherein the mobile communication device is one of:
   a cellular phone; and
   a personal digital assistant.

3. The method of claim 1 wherein the mobile communication device is a cellular phone and the determining that the mobile communication device has been moved step comprises one or more of the sub-steps:
   receiving a signal from a global positioning system application associated with the mobile communication device;
   detecting changes in an image as viewed from a camera associated with the mobile communication device;
   detecting changes in an acceleration of the mobile communication device; and
   detecting changes in a mobile communication signal strength associated with the mobile communication device.

4. The method of claim 1 wherein the first alert signal is at least one of:
   an audible alert;
   a visual alert; and
   a physical alert.

5. The method of claim 1 wherein the determining steps are performed by a processor executing application programming.

6. The method of claim 1 wherein the determining steps are performed by a specially configured application specific integrated circuit.

7. The method of claim 1, wherein the determining that the mobile communication device has been moved step comprises at least two of:
   receiving a signal from a global positioning system application associated with the mobile communication device;
   detecting changes in an image as viewed from a camera associated with the mobile communication device;
   detecting changes in an acceleration of the mobile communication device; and
   detecting changes in a mobile communication signal strength associated with the mobile communication device.

8. A mobile communications system comprising:
   an alert mechanism associated with a mobile communication device operable to produce a human perceptible alert signal indicating a condition, wherein the condition is at least one of: a missed call, a voice message received by the mobile communication device, a text message received by the mobile communication device, a low battery state, a change in service, an appointment, and an alarm;
   a motion detection mechanism included in the mobile communication device operable to sense physical motion of the mobile communication device and also sense when the mobile communication device has not been moved; and
   a motion detection application, associated with the mobile communication device, operable to receive a sensed signal from the motion detection mechanism and determine that the mobile communication device has been physically moved;
   wherein the alert mechanism is operable to produce a first alert signal associated with an occurrence of the condition, wherein the alert mechanism is operable to produce, in a first mode, a second alert associated with the occurrence of the condition when movement of the mobile communication device is detected by the motion detection application, and in a second different mode, to automatically disable the alert mechanism when no movement of the mobile communication device is detected by the motion detection application until movement of the mobile communication device is detected.

9. The system of claim 8, wherein the motion detection mechanism is at least one of a global positioning system receiver, a camera, a radio frequency signal strength measurement device, an accelerometer and a mercury switch.

10. The system of claim 8, wherein the mobile communication device is one of:
    a cellular phone; and
    a personal digital assistant.

* * * * *